(12) United States Patent
Bartlett et al.

(10) Patent No.: US 12,554,399 B1
(45) Date of Patent: Feb. 17, 2026

(54) ARRAY HASH MANAGEMENT FOR COMPUTE REQUESTS

(71) Applicant: International Business Machines Corporation, Armonk, NY (US)

(72) Inventors: Eric John Bartlett, Chard (GB); Dominic Tomkins, Alton (GB); Evelyn Marie Perez, Winchester (GB); Timothy Andrew Moran, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/909,524

(22) Filed: Oct. 8, 2024

(51) Int. Cl.
G06F 3/06 (2006.01)

(52) U.S. Cl.
CPC .......... *G06F 3/0608* (2013.01); *G06F 3/0641* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 11,314,440 B1 | 4/2022 | Wang et al. | |
| 11,487,726 B1 | 11/2022 | Ippatapu et al. | |
| 11,691,896 B2 | 7/2023 | Heller | |
| 11,947,419 B2 | 4/2024 | Hwang | |
| 2019/0213077 A1* | 7/2019 | Hofstee | G06F 11/1076 |
| 2020/0042235 A1* | 2/2020 | Schneider | G06F 13/1668 |
| 2020/0174689 A1* | 6/2020 | Hutchison | G06F 3/0689 |
| 2023/0361944 A1 | 11/2023 | Ki et al. | |
| 2024/0119162 A1 | 4/2024 | Bartlett et al. | |

OTHER PUBLICATIONS

Bartlett et al., U.S. Appl. No. 17/938,337, filed Oct. 6, 2022.
Tomkins et al., U.S. Appl. No. 18/754,491, filed Jun. 26, 2024.

* cited by examiner

*Primary Examiner* — Kaushikkumar M Patel
(74) *Attorney, Agent, or Firm* — Zilka-Kotab, P.C.

(57) ABSTRACT

A method, according to one approach, includes: receiving a compute request that corresponds to drive strips in a RAID array, and determining strip hash values that correspond to the respective drive strips. Drives in the RAID array that include one or more of the strip hash values are identified, and one of the identified drives is selected to conduct the compute request. The method also includes identifying one or more of the strip hash values that are not included in the selected drive. Strip data associated with the strip hash values identified as not being in the selected drive are read from other ones of the identified drives. Moreover, the strip data read from the other ones of the identified drives are written into spare storage space of the selected drive. The method further includes causing the selected drive to perform the compute request on the strip data therein.

20 Claims, 9 Drawing Sheets

ARRAY HASH MANAGEMENT FOR COMPUTE REQUESTS

BACKGROUND

The present invention relates to data storage arrays, and more specifically, this invention relates to redundant array of independent disks (RAID) arrays.

Data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data. Storing data in an efficient and effective manner has therefore been difficult to achieve.

While storing data in RAID configurations has been implemented in an effort to improve data availability, the drives in conventional RAID arrays have implemented data deduplication using cryptographic hash values that create a fingerprint of the data. This fingerprint may thereby be compared against other hash values to determine whether a duplicate copy of data exists. However, computation of cryptographic hash values is a compute intensive process that can be challenging at times. Accordingly, dedicated hardware is used in some conventional products to calculate the hash values.

Other conventional products implement the hash value calculations in an existing compute component in an attempt to avoid the increased cost associated with the dedicated component. However, this increases the amount of the achievable throughput that is dedicated to calculating hash values.

SUMMARY

A method, according to one approach, includes: receiving a compute request that corresponds to drive strips in a RAID array, and determining strip hash values that correspond to the respective drive strips. Drives in the RAID array that include one or more of the strip hash values are identified, and one of the identified drives is selected to conduct the compute request. The method also includes identifying one or more of the strip hash values that are not included in the selected drive. Strip data associated with the strip hash values identified as not being in the selected drive are read from other ones of the identified drives. Moreover, the strip data associated with the identified strip hash values read from the other ones of the identified drives are written into spare storage space of the selected drive. The method further includes causing the selected drive to perform the compute request on the strip data associated with the strip hash values therein.

A computer program product, according to another approach, includes: one or more computer-readable storage media. The computer program product also includes program instructions that are stored on the one or more storage media to perform the foregoing method.

A computer system, according to yet another approach, includes: a processor set, and one or more computer-readable storage media. The computer system also includes program instructions that are stored on the one or more storage media to cause the processor set to perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
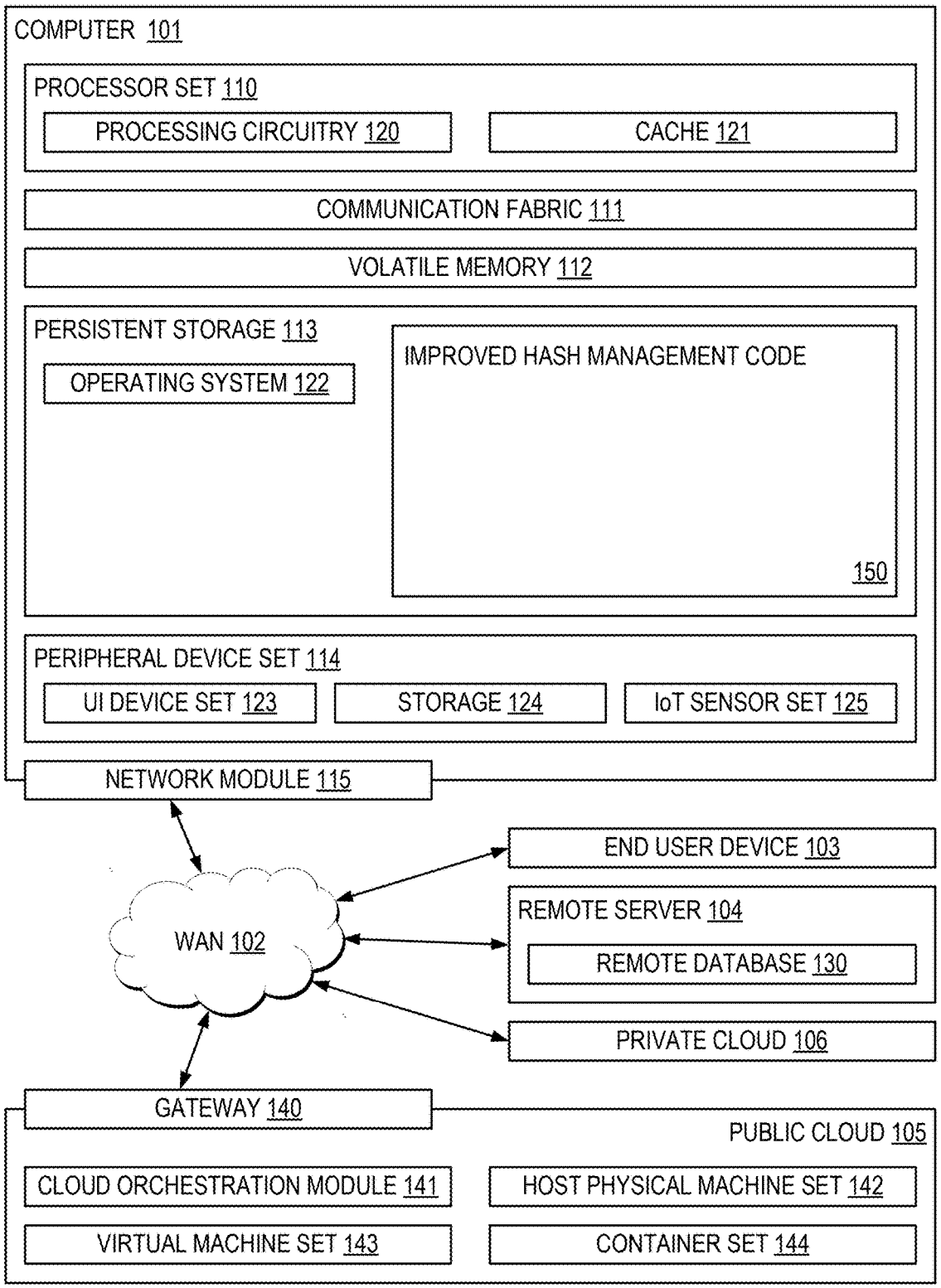
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for satisfying compute requests in a RAID array while managing hash arrays therein. The approaches herein thereby allow for compute requests to be performed in a RAID array while ensuring hash arrays therein are deduplicated. For instance, in a RAID array made up of deduplicating drives with a common hashing specification, the RAID layer can implement a hash management method to perform compute operations based on coordinating the distributed drive hash population, e.g., as will be described in further detail below.

In one general embodiment, a method includes: receiving a compute request that corresponds to drive strips in a RAID array, and determining strip hash values that correspond to the respective drive strips. Drives in the RAID array that include one or more of the strip hash values are identified, and one of the identified drives is selected to conduct the compute request. The method also includes identifying one or more of the strip hash values that are not included in the selected drive. Strip data associated with the strip hash values identified as not being in the selected drive are read from other ones of the identified drives. Moreover, the strip data associated with the identified strip hash values read from the other ones of the identified drives are written into spare storage space of the selected drive. The method further includes causing the selected drive to perform the compute request on the strip data associated with the strip hash values therein.

In another general embodiment, a computer program product includes: one or more computer-readable storage media. The computer program product also includes program instructions that are stored on the one or more storage media to perform the foregoing method.

In yet another general embodiment, a computer system includes: a processor set, and one or more computer-readable storage media. The computer system also includes program instructions that are stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved hash management code at block 150 for satisfying compute requests in a RAID array while managing hash arrays therein. Approaches herein thereby allow for compute requests to be performed in a RAID array while ensuring hash arrays therein are deduplicated. This achieves improved efficiency for the system as a whole, e.g., as will be described in further detail below.

In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data. Storing data in an efficient and effective manner has therefore been difficult to achieve.

While storing data in RAID configurations has been implemented in an effort to improve data availability, the drives in conventional RAID arrays have suffered from being unable to efficiently and reliably remove duplicate data. For instance, conventional products implement data deduplication using cryptographic hash values that create a fingerprint of the data. This fingerprint may thereby be compared against other hash values to determine whether a duplicate copy of data exists. However, computation of cryptographic hash values is a compute intensive process that can be challenging at times. Accordingly, dedicated hardware is used in some conventional products to calculate the hash values, but this significantly increases the implementation costs for such conventional products.

Other conventional products implement the hash value calculations in an existing compute component to avoid the increased cost associated with the dedicated component, but this results in a significant amount of the existing compute component's achievable throughput being dedicated to calculating hash values. This significantly reduces efficiency of the conventional products, resulting in a choice between poor performance or high cost, neither of which are desirable.

In sharp contrast to these conventional shortcomings, approaches herein are desirably able to satisfy compute requests in a RAID array while ensuring hash arrays therein are deduplicated. For instance, in a RAID array made up of deduplicating drives with a common hashing specification, the RAID layer can implement a hash management method to perform compute operations based on coordinating the distributed drive hash population. Data deduplication contributes to improving performance of a system by reducing the number of duplicate instances of data that are stored in memory. For instance, duplicate instances of data may be replaced with pointers to an initial instance of the data, thereby maintaining data integrity while also improving data storage capacity, e.g., as will be described in further detail below.

Figure 2A:
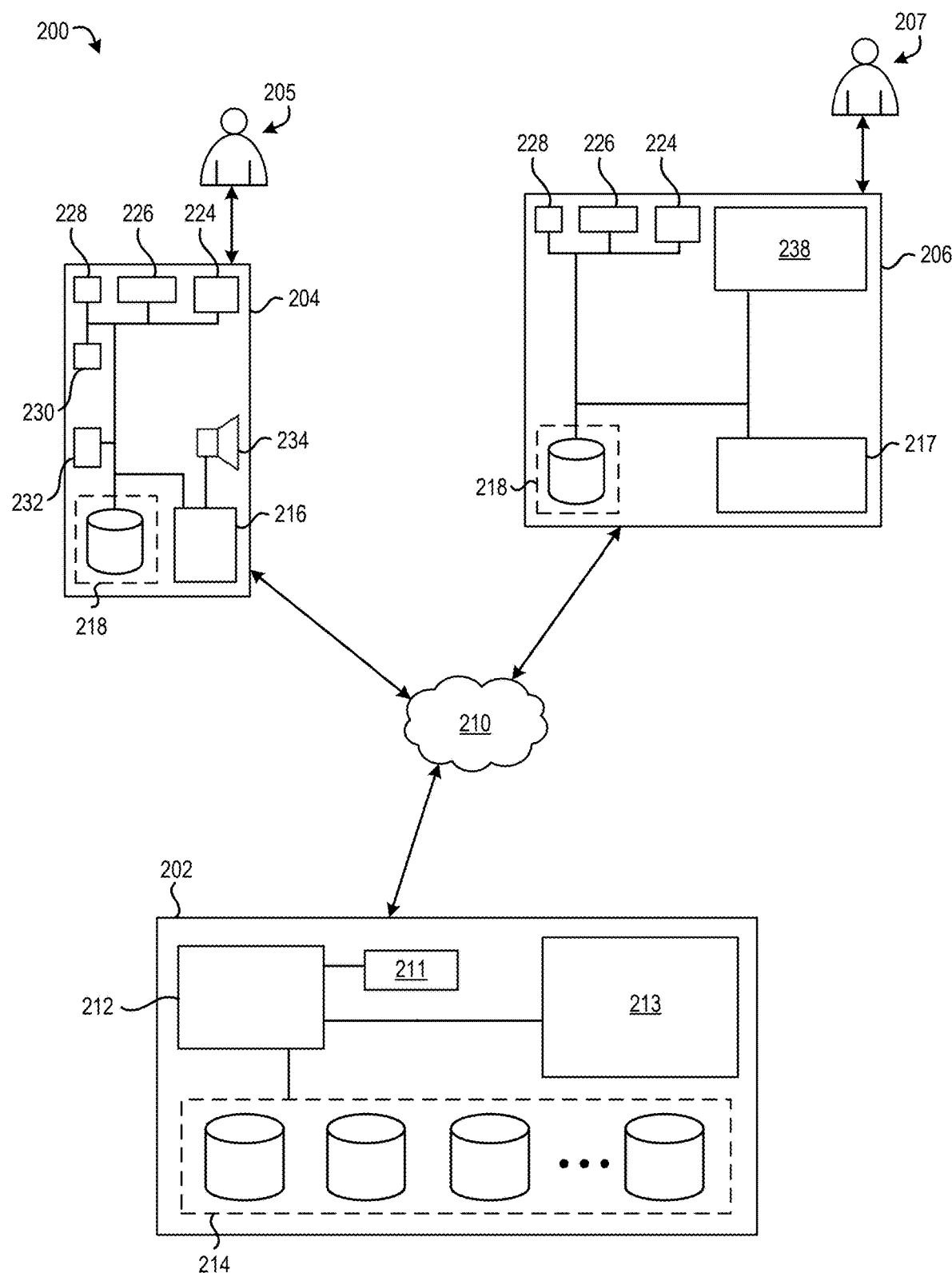
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The user device 204 and edge node 206 may thereby be considered "endpoint devices," each of which are connected to the central server 202. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206. Data may thereby be stored in one or more RAID arrays that stretch across the central server 202, user device 204, and/or edge node 206, e.g., as will be described in further detail below.

It should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description. The terms "user" and "administrator" are in no way intended to be limiting either. For instance, while users and administrators may be described as being individuals in various implementations herein, a user and/or an administrator may be an application, an organization, a preset process, etc. The use of "data," "datasets," and "information" herein are in no way intended to be limiting, and may include any desired type of details, e.g., depending on the type of operating system implemented on the user device 204, edge node 206, and/or central server 202.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI based models, e.g., such as machine learning models, deep learning models, neural networks, etc. For instance, one or more AI based models may be trained to scan data stored in memory for duplicate copies. In other approaches, one or more AI based models may be trained to convert storage drive data strips into corresponding strip hash values, e.g., as will be described in further detail below.

Depending on the approach, the data storage array 214 may include any desired type of data storage components therein. For instance, the data storage array 214 may include a plurality of solid state drives (SSDs), hard disk drives (HDDs), magnetic tape repositories, etc., and/or combinations thereof. Moreover, data may be stored (e.g., organized) in a RAID array that extends across the data storage array 214. For instance, a is RAID 0 type, RAID 1 type, RAID 2 type, RAID 3 type, RAID 4 type, RAID 5 type, etc., RAID array may be formed in the data storage array 214. It should be noted that in some approaches a RAID array of any desired type may extend across the storage components in the central server 202 as well as the storage components in the edge node 206.

User device 204 includes a processor 216 which is coupled to memory 218. The processor 216 receives inputs from and interfaces with user 205. For instance, the user 205 may input information and/or queries using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Compute request may be submitted by user 205 using user device 204 and central server 202. For instance, new data write operations, data deletions, data overwrites, data reads, etc., may be submitted and received at the central server 202 and/or the edge node 206. The compute requests may be received as a result of the user 205 using one or more applications, software programs, temporary communication connections, etc. running on the user device 204. For example, the user 205 may use user device 204 to enter (e.g., type) and upload a compute request to be evaluated and solved using processor 212 and/or AI module 213 of central server 202.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238. As described above with respect to AI module 213, the AI module 238 may include one or more AI based models may be trained to scan data stored in memory for duplicate copies. In other approaches, one or more AI based models may be trained to convert storage drive data strips into corresponding strip hash values, e.g., as will be described in further detail below.

Referring now to FIGS. 2B-2E, the operations associated with satisfying compute requests in the RAID array of a given system 240 while managing hash arrays therein is illustrated in accordance with one approach. As an option, system 240 and/or any of the operations performed therein may be implemented in conjunction with features from any other approach listed herein, such as those described with reference to the other FIGS. However, system 240 and others approaches presented herein may be used in various applications and/or in permutations which may or may not be specifically described in the illustrative approaches or implementations listed herein. Further, the system 240 and/or any of the operations presented herein may be used in any desired environment. Thus FIGS. 2B-2E (and the other FIGS.) may be deemed to include any possible permutation. It should also be noted that the each of the data storage drives in FIGS. 2B-2E preferably have the same (or substantially similar) drive strip size as well as the same (or substantially similar) hash grain size. This desirably ensures that each of the data storage drives are effectively running the same hashing mechanism, thereby allowing for the strip hashes to be equivalent across the data storage drive population, e.g., as would be appreciated by one skilled in the art after reading the present description.

Figure 2B:
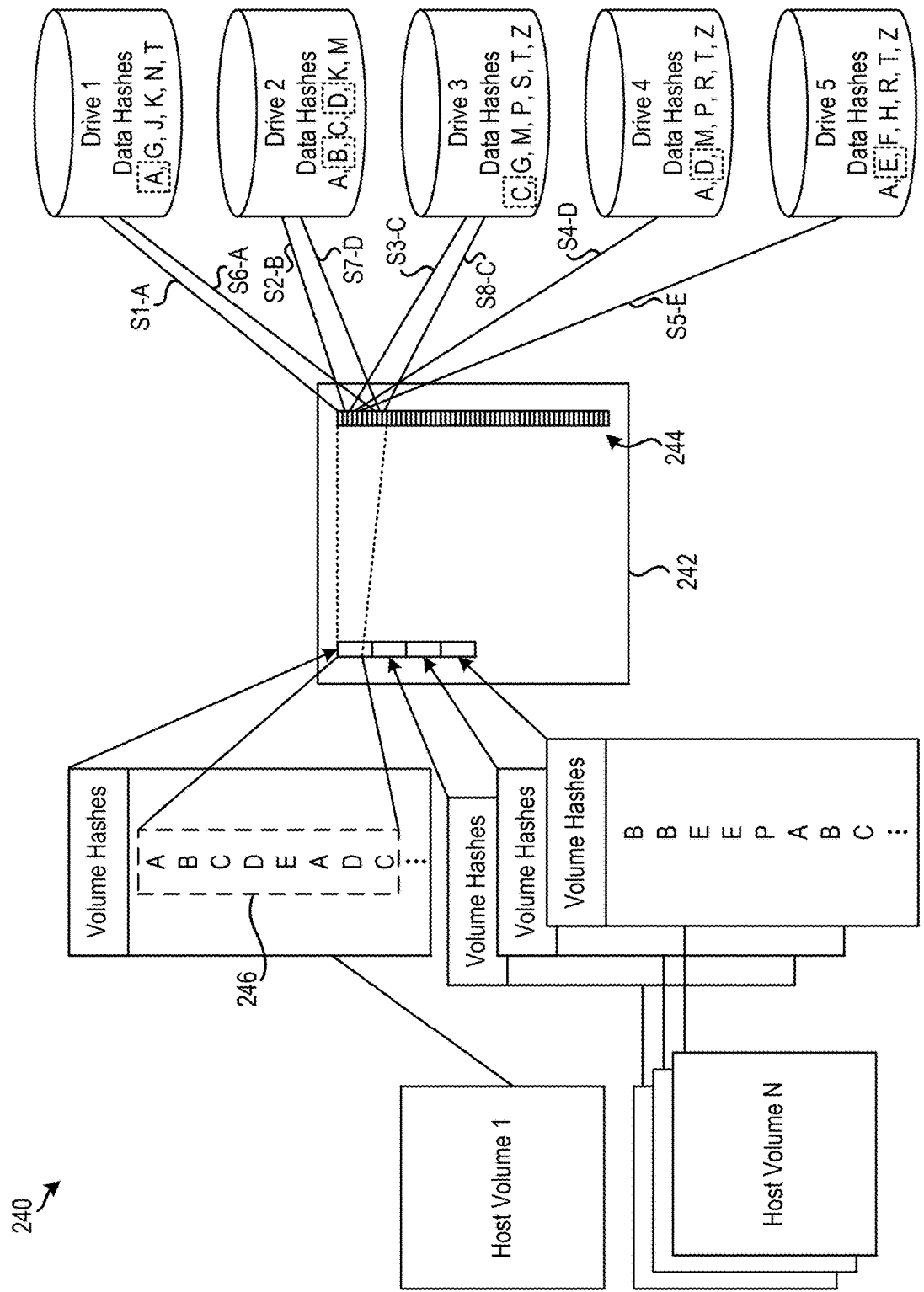
FIG. 2B is a representational diagram of satisfying compute requests, in accordance with one approach.

Looking first to FIG. 2B, the system 240 is shown as including a single RAID array in the controller space 242. As shown, the RAID array includes five different data storage drives (Drive 1, Drive 2, Drive 3, Drive 4, Drive 5) in the present configuration. For approaches herein, each of the data storage drives preferably generates an identical strip hash value for the same data that is written to a given drive strip. Thus, the drive data strip size and grain size are preferably the same (or at least substantially similar) for each of the drives, and the drive hash algorithm generates identical (or at least substantially similar) results on each drive.

The RAID array is also correlated with multiple host volumes (Host Volume 1, . . . , Host Volume N) which include data that has been written to the RAID array. Subsets of data that are stored in the RAID array may be represented by respective strip hash values. Each strip hash value is generated and stored by the deduplicating drive storing the data written to that strip, where the strip hash generation is part of the deduplication implementation for the drives. For instance, subsets (e.g., groupings) of data in Host Volume 1 are shown in the Volume Hashes as corresponding to strip hash values A, B, C, D, E, A, D, C, . . . . Similarly, the subsets (e.g., groupings) of data in Host Volume N are shown in the Volume Hashes as corresponding to strip hash values B, B, E, E, P, A, B, C, . . . . The Volume Hashes from each Host Volume are further stored in or mapped to respective sections of the controller space 242, e.g., as shown.

The volume hash knowledge for the compute request is preferably only built by the controller during the compute request, e.g., as will be described in further detail below. It should also be noted that with respect to the present description, "strip hash values" refer to hash values that are correlated with respective data storage drive strips. In other words, the strip hash values each correspond to a specific physical drive strip and the data therein, e.g., as would be appreciated by one skilled in the art after reading the present description.

The Volume Hashes from the various Host Volumes are further correlated with respective drive strips 244, each of which correspond to a respective portion of one of the data storage drives. It follows that in situations where a compute request that impacts (e.g., modifies or at least references) the data represented by one or more of the Volume Hashes, the Volume Hashes may be used to extrapolate specific ones of the drive strips in the RAID array that store the data being impacted by the compute request.

For example, in the present approach a compute request may be received (e.g., from a host of the RAID array) that impacts the Volume Hashes identified in box 246. As shown, the Volume Hashes identified in box 246 are correlated with specific ones of the drive strips 244. Moreover, each of the specific drive strips 244 map to data stored in a respective one of the data storage drives. For instance, data strip S1 is depicted as being correlated with Volume Hash A and located in Drive 1. Similarly, data strip S6 is shown as also being correlated with Volume Hash A and located in Drive 1. Data strip S2 is depicted as being correlated with Volume Hash B and located in Drive 2, while data strip S7 is depicted as being correlated with Volume Hash D and also located in Drive 2. Data strips S3 and S8 are depicted as being correlated with Volume Hash C and located in Drive 3. Moreover, data strip S4 is depicted as being correlated with Volume Hash D and located in Drive 4, while data strip S5 is depicted as being correlated with Volume Hash E and located in Drive 5.

It follows that in some approaches, the data strips are used to generate the strip hash values as used herein. The strip hash values may thereby represent the data that is stored in the RAID array, which may be visible or accessible via the corresponding volume logical block address (LBA) ranges for the respective data strips. In other words, a host may submit a compute request by actually writing data, and the data strips that are impacted by the data writing may be represented with the hash references, e.g., as would be appreciated by one skilled in the art after reading the present description. However, it should be noted that the number of data storage drives, host volumes, volume hashes, RAID arrays, types of RAID arrays, etc., that are depicted and/or described herein are in no way intended to be limiting and may vary depending on the given approach.

Figure 2C:
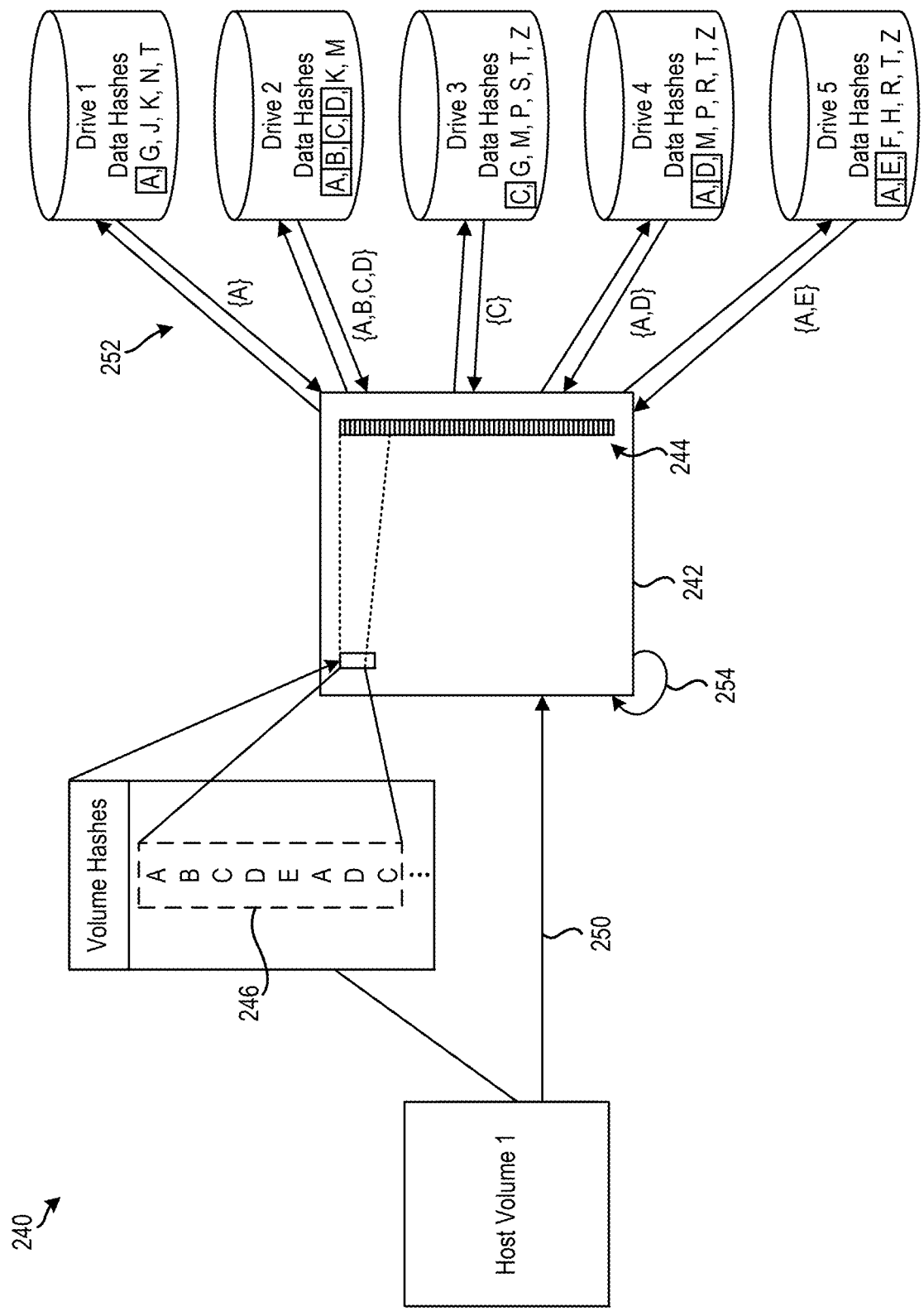
FIG. 2C is a representational diagram of satisfying compute requests, in accordance with one approach.

Proceeding now to FIG. 2C, operations associated with selecting the data storage drive that is used to ultimately perform the received compute request are shown. As noted above, the compute request received in the present approach corresponds to eight different drive strips. See operation 250. Accordingly, the host is requesting the compute operation be performed for a particular LBA range which maps to eight physical drive strips. Moreover, these eight drive strips correspond to the Volume Hashes A, B, C, D, E, A, D, C. In other words, a host of the RAID array may submit a compute request (e.g., operation) for a LBA range that is represented by array data strips S1-S8, which in turn are correlated with (e.g., represented by) volume hashes A, B, C, D, E, A, D, C. The array receives the compute request and then queries the drives for the associated hashes, building the compute hash list. In other words, the actual values of the hashes that are included on each of the drives are queried for the referenced drive strips.

In response to receiving the compute request, and before advancing to operation 252, the array preferably queries the drives and determines strip hash values that correspond to (e.g., represent) the respective drive strips. In other words, the hash values which represent the data that is included in the data storage drive strips of memory are identified, and referenced in the received compute request. In some approaches, the process of determining the strip hash values that correspond to (e.g., represent) the respective drive strips includes performing geometry lookups.

Proceeding now to operation 252, the RAID array queries the data storage drives for strip hash values that are associated with the drive strips S1-S8 that are referenced in the compute request. In response to querying the data storage drives, the RAID array evaluates the contents of each drive to determine which drive has access to the greatest number of the hashes in the compute hash list. See operation 254. For instance, Drive 1 is shown as only including strip hash value A, while Drive 2 is shown as including strip hash values A, B, C, D. Moreover, Drive 3 is shown as including strip hash value C, Drive 4 is shown as including strip hash values A, D, while Drive 5 is shown as including strip hash values A, E. It follows that in response to reviewing the distribution of strip hash values, the controller space 242 may select Drive 2 to perform the compute request because it already includes the greatest number of the strip hash values, e.g., compared to the other data storage drives. However, it should be noted that other factors may be taken into consideration while selecting the data storage drive to conduct the received compute request. For instance, in some approaches, the drives are evaluated based on an amount of available storage space therein. Accordingly, the drive that includes the greatest number of the strip hash values and which has sufficient space to conduct the received compute request may be ultimately selected. In still other approaches, the reliability (e.g., health status) of the available drives may be taken into consideration while selecting one to perform the compute request.

Figure 2D:
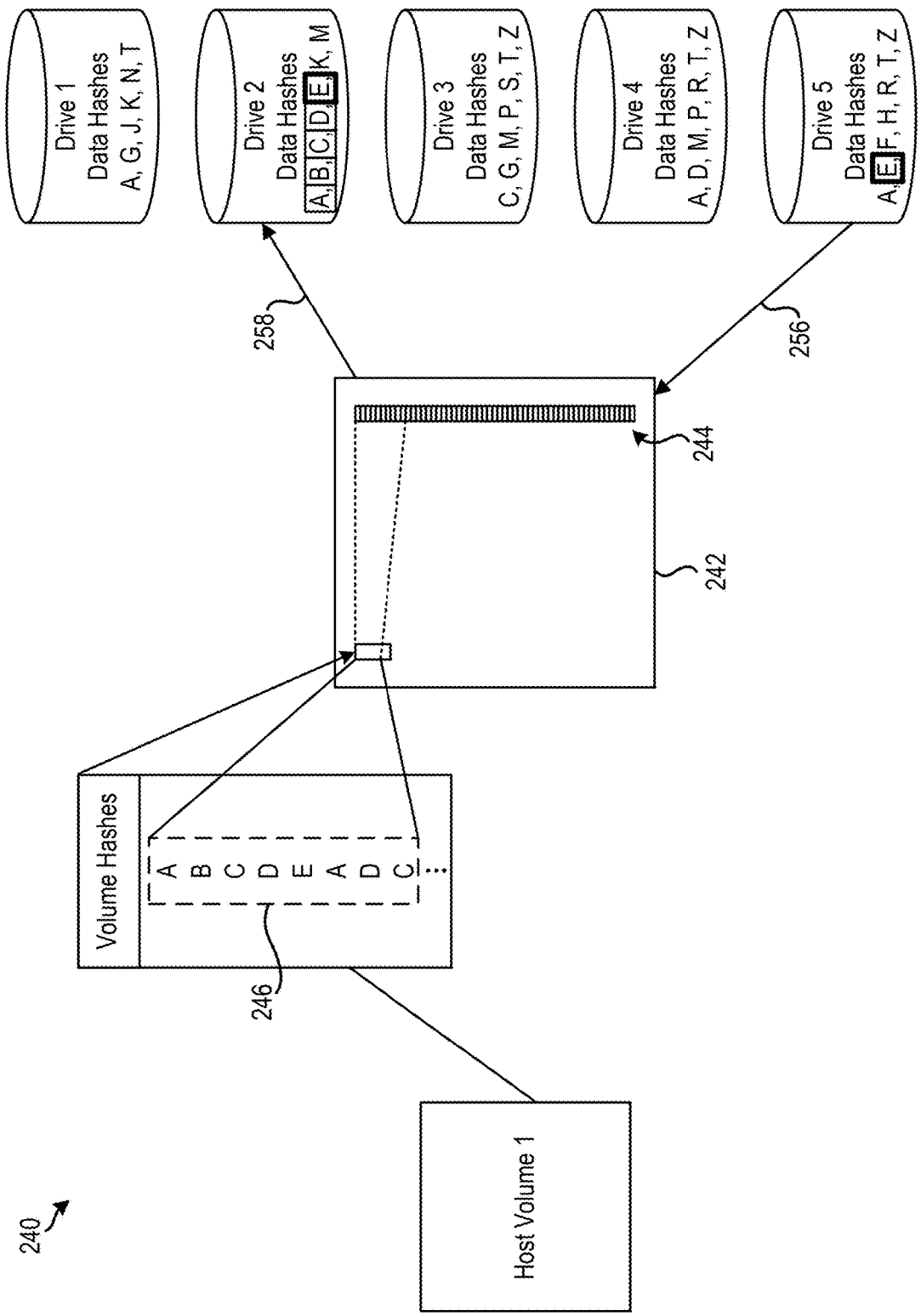
FIG. 2D is a representational diagram of satisfying compute requests, in accordance with one approach.

Looking now to FIG. 2D, the operations associated with preparing the compute data on the selected Drive 2 is shown. This is achieved at least in part by reading the missing strip hash values from other ones of the data storage drives, and writing the corresponding data into spare storage capacity on selected Drive 2. In other words, any strip hash values referenced in the compute request which are not already located in the selected Drive 2 are preferably obtained from the remaining data storage drives. This prepares Drive 2 for the compute request to be performed at the drive. For instance, operation 256 includes reading any missing drive strip hashes from the remaining drives. Here, strip hash value E is not included in selected Drive 2, and therefore operation 256 includes causing strip hash value E to be read from Drive 5, while operation 258 includes writing the missing data associated with strip hash value E into Drive 2. In some approaches, the missing data associated with strip hash value E may be written to a spare strip in Drive 2, unallocated capacity in Drive 2, etc. It follows that Drive 2 preferably includes a sufficient amount of free (unused) storage space to accommodate the missing data.

Figure 2E:
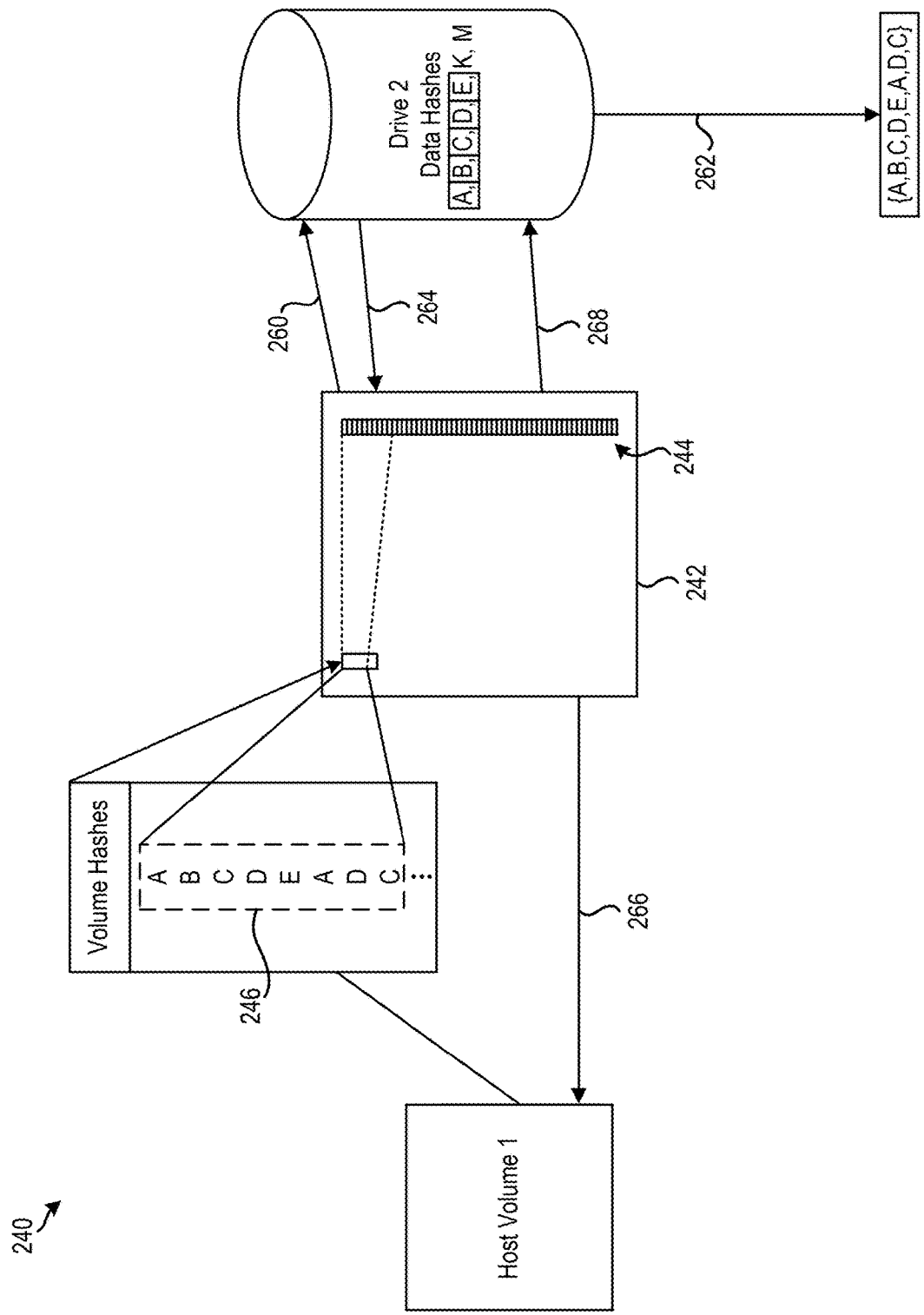
FIG. 2E is a representational diagram of satisfying compute requests, in accordance with one approach.

Looking now to FIG. 2E, the process of performing the compute request at the selected drive is illustrated. At this point, Drive 2 has all the data that is associated with performing the compute request. Accordingly, operation 260 includes sending the compute operation, the target grain hash list, and one or more instructions that cause the selected Drive 2 to complete the compute operation. The compute operation may be sent in the form of a hash table in some approaches. The hash table may desirably list out the order of hashes that represent the working data for the compute request. This hash table may also be associated with the volume hashes that correspond to the LBA ranges the volume has requested the compute request for.

In response to receiving the information in operation 260, operation 262 includes the Drive 2 creating a temporary compute snapshot of the drive strips identified by the strip hash values, and performing the compute request on the temporary compute snapshot. In preferred approaches, the snapshot is an ordered snapshot that is formed using the hash ordering. However, this may not necessarily relate to any other virtual addressable range(s) on the data storage drive or physical addressable range(s) on the data storage drive. Rather, the snapshot LBA range is linked to the appropriate hashes, e.g., such that the snapshot has sufficient data to operate. It follows that the deduplication may be leveraged in some approaches, e.g., because the snapshot will essentially become another referral in the deduplication instance.

Proceeding to operation 264, there Drive 2 returns the results (e.g., output) of performing the compute request. The snapshot formed at Drive 2 is preferably deleted in response to the compute request being completed. Moreover, operation 266 includes returning the compute request results (e.g., outputs) from the controller space 242 to the host. The outputs may be reflected in Host Volume 1 in some approaches, e.g., depending on the type of compute request. In response to the output being sent to the source of the compute request, operation 268 includes causing Drive 2 to unmap any compute only drive strips that are in the drive. In other words, operation 268 includes removing any data strips that have been added to Drive 2 in order to perform the compute request.

FIGS. 2B-2E thereby illustrate how satisfying a received compute request involves a population of drives that preferably have a common hash policy (e.g., Secure Hash Algorithm 256-bit hashing, etc.) and a common hash data "grain" size. As used herein, the "grain" size corresponds to the number of LBAs that are used to build each hash entry value typically stored in an LSA. Data storage drives herein also preferably support a number of interactions with the RAID layer (e.g., via Small Computer System Interface (SCSI) commands, etc.). These supported interactions may include the ability to query the drive hash method and grain size, e.g., to verify drive population equivalence. The supported interactions may also include the ability to query what a drive's strip hash value is for a specific LBA range and/or hash grain. These supported interactions may further include the ability to query if a data storage drive already contains a specific grain strip hash value. Further still, the supported interactions may include the ability to send a compute request based on a hash list, e.g., which may not be associated with any contiguous drive virtual and/or physical LBA range(s).

FIGS. 2B-2E also illustrate how a host volume provides host addressable capacity that a corresponding controller presents as a RAID array. Control of the drives in the RAID array may be presented to a host of the RAID array. For instance, the volume is preferably a virtual address space that is presented to the host, allowing the host to define an LBA range or capacity in a compute request, which is ultimately provisioned from the controller. The controller is thereby presenting a volume to the host that the host can access by specifying certain LBA ranges (e.g., capacity). Moreover, the raid array capacity is linked to strips of drive capacity which the RAID array is configured to protect, and which are distributed across the drives depending on the specific RAID geometry. The system 240 in FIGS. 2B-2E thereby includes a host machine (e.g., host volume), the controller space which is running the RAID array, and the data storage drives that stored the data therein.

Figure 3A:
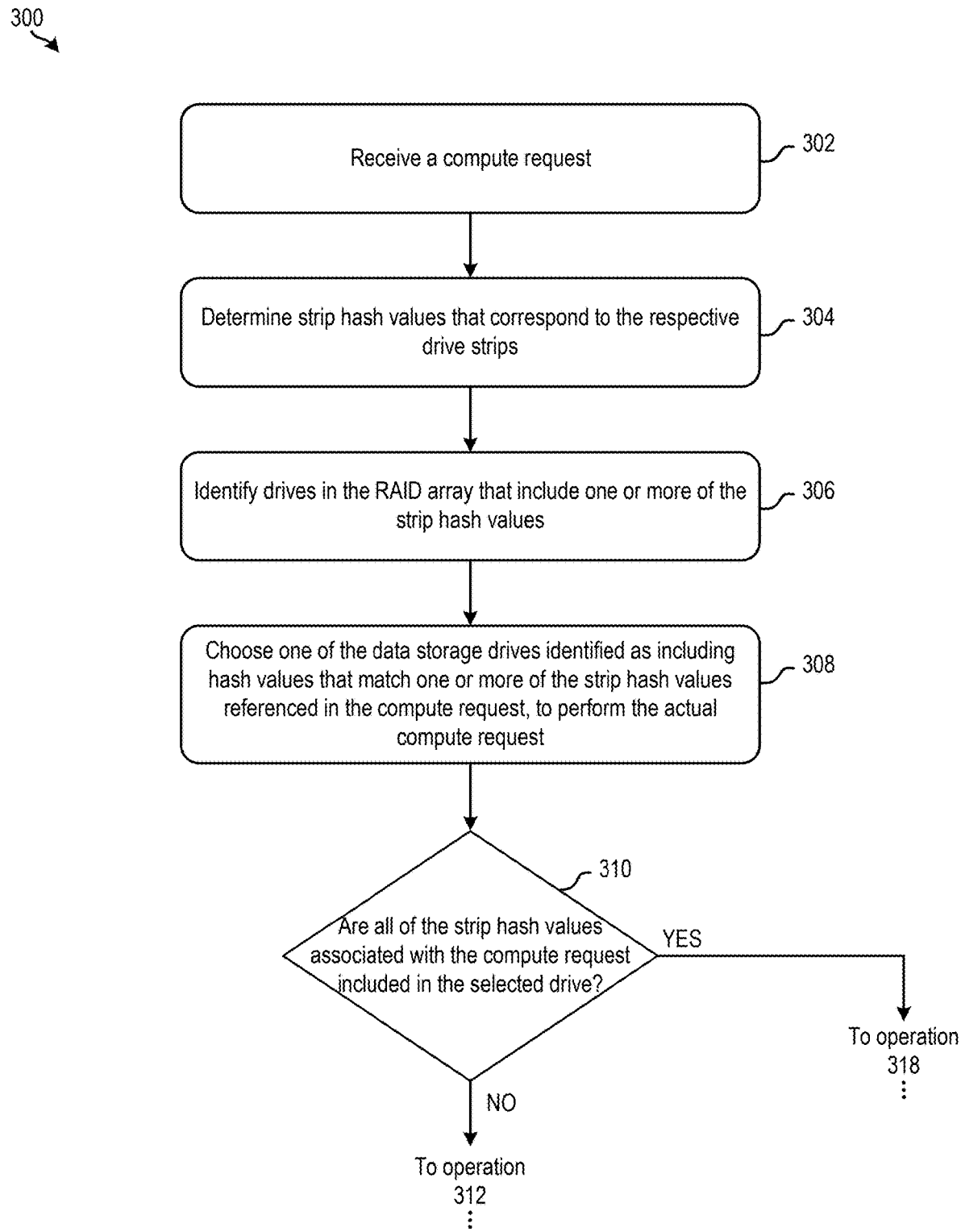
FIG. 3A is a flowchart of a method, in accordance with one approach.
Figure 3A:
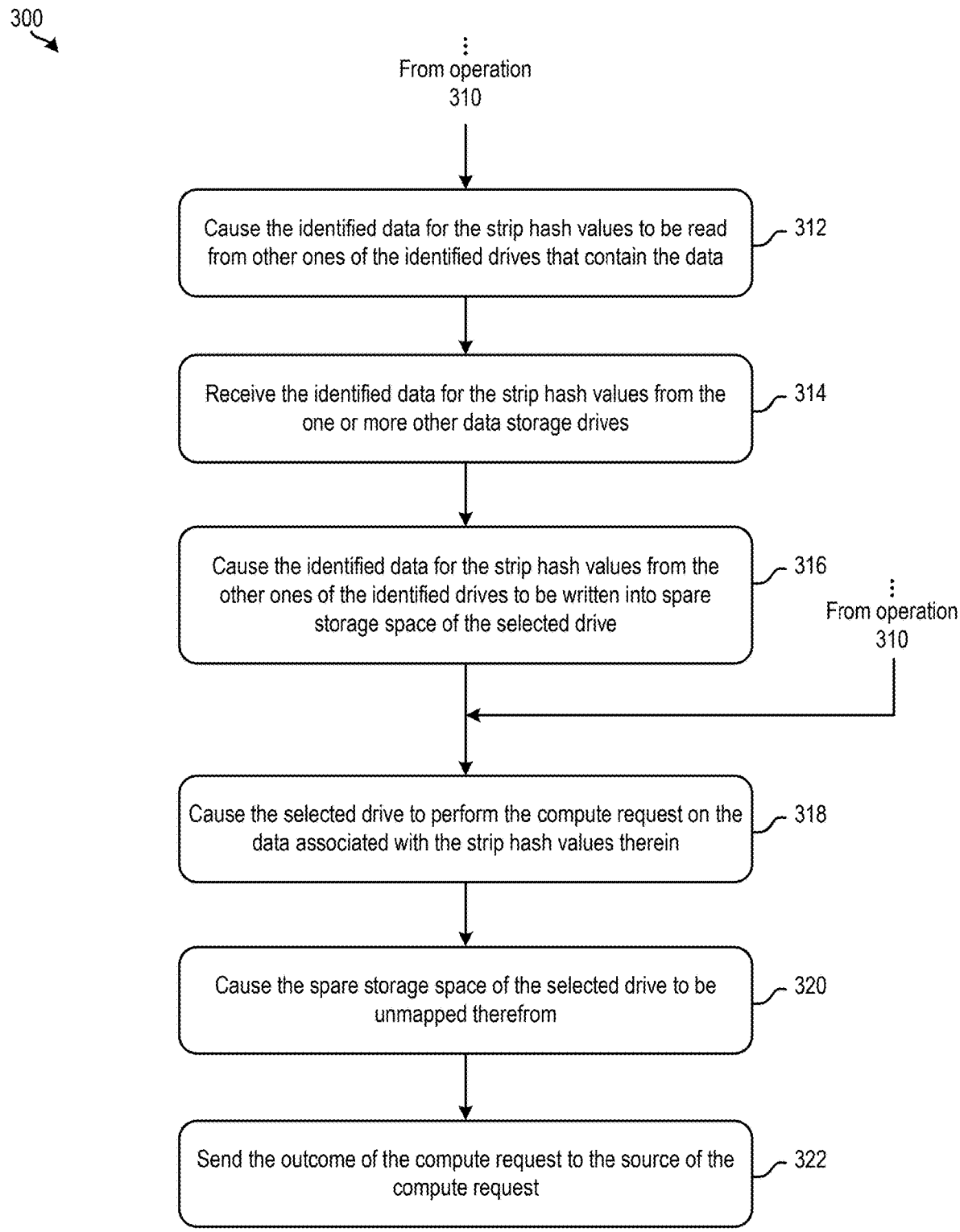

Looking now to FIG. 3, a flowchart of a method 300 for satisfying compute requests in a RAID array while managing hash arrays therein is illustrated in accordance with one approach. The operations in method 300 allow for the controller RAID array logic to implement a hash management procedure to perform a compute request operation as described below based the RAID array host, the RAID array itself, and the data storage drive(s). The operations of method 300 are further expressed based on a distributed RAID geometry where spare drive strips are distributed across all the member drives of the RAID array. The method 300 may be performed in accordance with the present invention in any of the environments depicted in FIGS. 1-2B, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in some approaches one or more of the operations in method 300 may be performed by a controller at a central data storage location (e.g., see processor 212 of FIG. 2A). However, the method 300 may be partially or entirely performed by a controller, a processor, a computer, etc., or some other device having one or more processors therein. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 302 includes receiving a compute request that corresponds to (e.g., involves) drive strips in a RAID array. In some approaches, the compute request is received from a host of a RAID array that includes the data that is referenced in the compute request. However, the compute request may be received from one or more running applications, AI based models (e.g., as an output), automatically in response to a predetermined condition being met, etc. Moreover, the type of compute request itself may differ depending on the approach. As noted above, the compute request may include a data deletion, new data write operation, data overwrite (e.g., modify write) operation, read-modify-write operation, etc.

In response to receiving the compute request, method 300 advances from operation 302 to operation 304. There, operation 304 includes determining strip hash values that correspond to (e.g., represent) the respective drive strips. In other words, operation 304 includes identifying the hash values that represent the data that is included in the data storage drive strips of memory, and referenced in the received compute request.

In some approaches, the process of determining the strip hash values that correspond to (e.g., represent) the respective drive strips includes performing geometry lookups. For example, one or more instructions may be sent by a controller (e.g., see controller space 242 of FIG. 2B-2E) to each of the data storage drives that are included in a RAID array, the one or more instructions ultimately causing geometry lookup operations to be performed for each of the drive strips associated with the compute request.

For instance, the controller RAID array which manages (e.g., "owns") the given RAID geometry is preferably used to perform the geometry lookup to determine which drive strip is associated with a specific strip sized Volume LBA range. With respect to the present description, the Volume LBA (e.g., LBA range) is being referenced as the logical address, and the controller RAID array is performing the logical-to-physical table (LPT) lookup using the RAID geometry, whereby the "physical" address referenced is the drive LBA. It should also be noted that for deduplicating drives, the drive LBA itself (from the drives perspective) is the Logical Block Address of the drive. Moreover, it will have its own internal lookup within the deduplicating database. The deduplicating drive may thereby look up the strip hash value associated with the drive strip data, e.g., as would be appreciated by one skilled in the art after reading the present description.

For instance, the compute request may reference one or more LBAs that are correlated with one or more respective drive strips. The compute request may thereby be submitted without identifying the specific drive strips and/or corresponding strip hash values. Rather, the LBA range may be used in combination with a LPT to identify the physical drive strips that map to the LBA range specified in the compute request. The physical drive strips may thereby be used to identify the corresponding strip hash values.

Data storage drives that are identified as including one or more of the drive strips that are associated with the compute request are queried. The identified drives are preferably queried for the internal hash values included in each the respective identified drives. These hash values may be used to represent the data included in the respective drive strips in a condensed manner, e.g., as would be appreciated by one skilled in the art after reading the present description.

The internal hash values that are returned from each of the queried data storage drives may thereby be used to build a compute request hash list. In other words, the hash values that are internal to each of the drives identified as including at least one drive strip associated with the compute request are combined and organized into a hash list that outlines the extents of the received compute request. This hash list may thereby be used to quickly and easily identify which portions of the data modified by the compute request are located in each of the data storage drives. This information may further be used to adjust how and/or where the compute request is ultimately performed, e.g., as will be described in further detail below.

In response to identifying the strip hash values that are correlated with the received compute request, method 300 advances from operation 304 to operation 306. There, operation 306 includes identifying drives in the RAID array that include one or more of the strip hash values. In other words, operation 306 includes comparing the strip hash values that are identified as outlining the extent of the data referenced in the compute request, to the contents of any available data storage drives. As noted above, this may be accomplished by comparing the strip hash values outlining the compute request to a list of hash values that are included in each drive. It follows that operation 306 may be accomplished by querying each of the data storage drives individually and determining the hash values that represent the strips of data in the respective drives (e.g., see FIGS. 2B-2E).

Advancing from operation 306 to operation 308, there method 300 includes selecting one of the drives identified in operation 306 to conduct the compute request. In other words, operation 308 includes choosing one of the data storage drives identified as including hash values that match one or more of the strip hash values referenced in the compute request, to perform the actual compute request. In some approaches, the data storage drive identified as having a greatest number of the strip hash values already included therein may be selected in operation 308. However, as noted above, other factors may be taken into consideration while selecting the data storage drive to conduct the received compute request. For instance, in some approaches, the drives are evaluated based on an amount of available storage space therein. Accordingly, the drive that includes the greatest number of the strip hash values and which has sufficient space to conduct the received compute request may be ultimately selected. In still other approaches, the reliability (e.g., health status) of the available drives may be taken into consideration while selecting one to perform the compute request. Accordingly, a drive that includes a relatively high number of the strip hash values, and which has sufficient available space therein, and which has a relative health value that is in a predetermined range (e.g., or equivalently above a predetermined threshold), may be selected to perform the compute request.

In response to selecting one of the data storage drives to perform the compute request, method 300 advances from operation 308 to operation 310. There, operation 310 includes inspecting the selected data storage drive and determining whether all of the strip hash values associated with the compute request are included in the selected drive. While it is common for the data referenced in a given compute request to be distributed across two or more data storage drives in implementations where RAID arrays are utilized to increase data retention and security, some situations (e.g., relatively small or simple compute requests) may involve all relevant strip hash values being located in the same drive. Thus, in response to determining that the selected data storage drive includes all the strip hash values that are referenced in the compute request, method 300 jumps directly to operation 318. However, in response to determining that the selected data storage drive does not include at least one of the strip hash values that are referenced in the compute request, method 300 advances to operation 312.

As shown, operation 312 includes causing the identified strip hash values to be read from other ones of the identified drives that contain the data. In other words, in response to identifying data stored on one or more of the drive strips that is missing from the selected drive, operation 312 includes sending one or more instructions to the data storage drives determined as including the "missing" data for the strip hash values not in the selected drive. The one or more instructions may include commands, requests, operating instructions, etc., that ultimately cause the drive(s) to which the instructions are sent, to read the data in the missing strip hash values therefrom.

Operation 314 includes receiving the identified (e.g., missing) data for the strip hash values from the one or more other data storage drives. Furthermore, operation 316 includes causing the identified strip hash values read from the other ones of the identified drives to be written into spare storage space of the selected drive. In other words, operation 316 may include sending one or more instructions, along with the copies of the data in the missing strip hash values, to the selected drive. The one or more instructions preferably ultimately cause the data in the missing strip hash values to be written into available data storage space in the selected drive. For instance, one or more of the data strips in the selected drive may be reserved for overflow situations and used to at least temporarily store data associated with performing a received compute request.

Figure 3B:
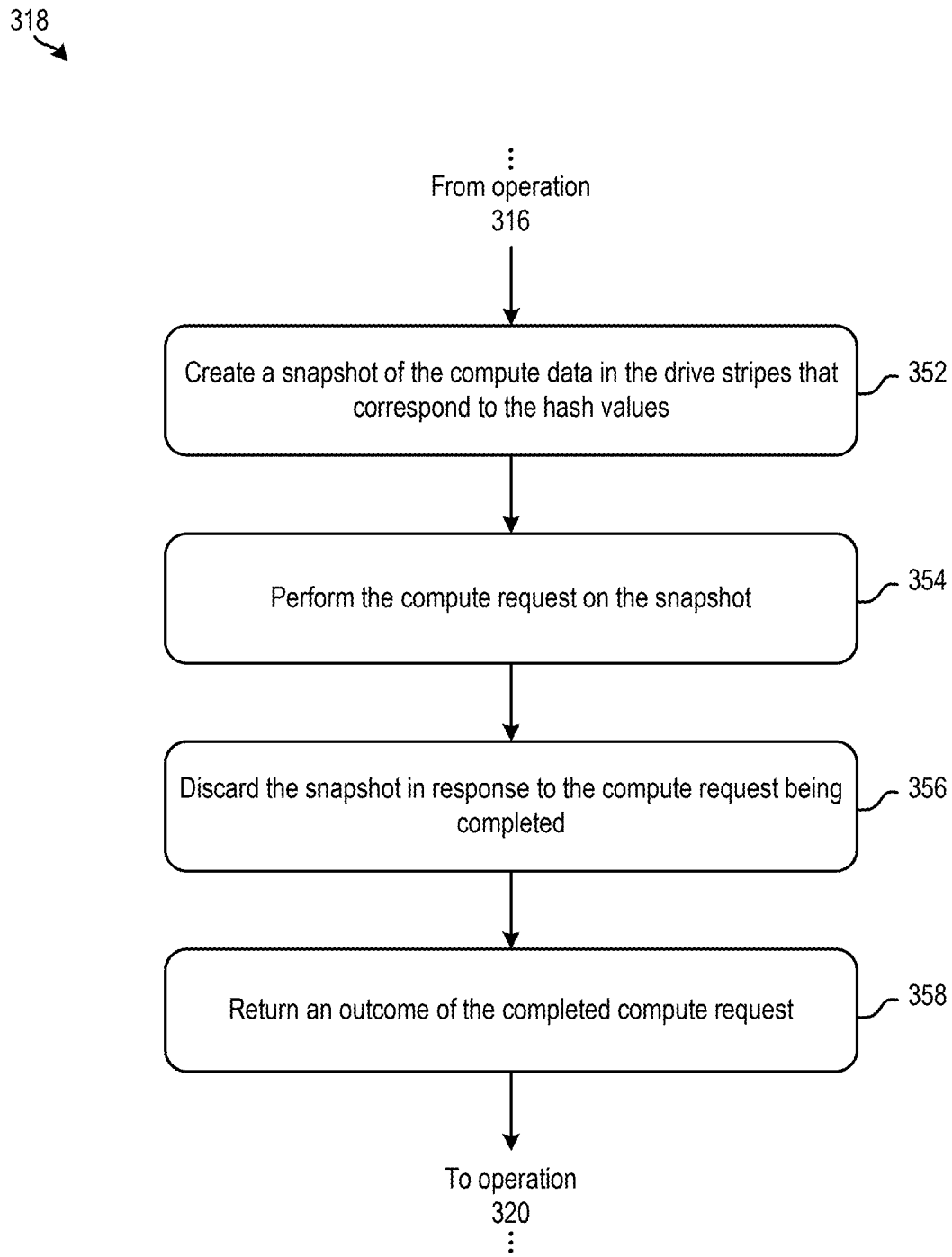
FIG. 3B is a flowchart of sub-operations for one of the operations in the method of FIG. 3A, in accordance with one approach.

With continued reference to FIG. 3, in response to the identified strip hash values read from the other ones of the identified drives being written into spare storage space (e.g., regions) of the selected drive, method 300 advances from operation 316 to operation 318. There, operation 318 includes causing the selected drive to perform the compute request on the data associated with the strip hash values therein (which represents the host data the compute request is made on). The process of performing the compute request may vary depending on the type of compute request, the selected data storage drive, the size of the compute request, etc. Looking momentarily to FIG. 3B, exemplary sub-operations of perform a compute request at a given data storage drive are illustrated in accordance with one approach. It follows that one or more of these sub-operations may be used to perform operation 318 of FIG. 3A. However, it should be noted that the sub-operations of FIG. 3B are illustrated in accordance with one approach which is in no way intended to be limiting.

As shown, sub-operation 352 includes creating a snapshot of the compute data in the drive strips that correspond to the hash values. In other words, a snapshot of the data that is included in the drive strips that the hash values reference (e.g., correspond to) is created. It follows that the snapshot is created based at least in part on the hash sequence that is correlated with the compute request. The snapshot may be formed using any one or more processes that would be apparent to one skilled in the art, and may be stored in memory as desired.

Advancing to sub-operation 354, there the compute request is performed on the snapshot. Performing the compute request using the snapshot is desirable because the data in the selected drive is maintained. This is particularly true when dealing with situations where data referenced in the compute request is at least temporarily copied from other data storage drives to the selected drive. For instance, using the snapshot to perform the compute request allows for the data in the drives to be accessible while the compute request is performed. It follows that modification to the data in the data storage drives (e.g., including the selected drive) may be allowed. In other words, a hold on the data storage drives storing the data that is included in a RAID array is lifted in response to the snapshot being created, thereby allowing for the RAID array to resume satisfying data operations. Thus, in response to receiving an indication that the snapshot has been created, data modifications (e.g., new data writes, deletions, overwrites, etc.) are permitted to resume in the RAID array without creating any data corruption, data loss, etc.

Moreover, after the compute request has been completed, data copied from other ones of the available drives may be removed from the selected drive and the system as a whole may return to nominal operation. Accordingly, the flowchart proceeds from sub-operation 354 to sub-operation 356. There, sub-operation 356 includes discarding the snapshot in response to the compute request being completed. Moreover, sub-operation 358 includes returning an outcome of the completed compute request. The outcome of the completed compute request is preferably returned to the controller space that is managing (e.g., hosting) the RAID array. Accordingly, the outcome may be evaluated, modified, reproduced, etc., before being sent to the source of the initial compute request.

Returning now to FIG. 3A, method 300 advances from operation 318 to operation 320 in response to the compute request being successfully performed at the selected drive and an outcome of the completed compute request being received therefrom. There, operation 320 includes causing the spare storage space of the selected drive to be unmapped therefrom. In other words, operation 320 includes removing any of the data copied to the selected drive from other ones of the drives in the RAID array. Depending on the type of data storage drives are implemented, operation 320 may be performed by unmapping the drive strips that were used to store the data received from other ones of the drives. This desirable ensures that each of the data storage drives include a desired amount of available storage space therein. Furthermore, operation 322 includes sending the outcome of the compute request to the source of the compute request. In other words, operation 322 includes sending information outlining a result of the compute request to the RAID host, running application, AI based model, etc. that originally issued the compute request received in operation 302.

Although not depicted in FIG. 3A-3B, the drive selected to perform a compute request may experience failure(s) before the compute request can be completed. For instance, the selected drive may experience a failure that causes the drive itself to become inoperable. This may occur at any point during the process of performing the various operations in method 300, and is preferably resolved in real-time by dynamically reacting to any errors that occur. Thus, in response to a drive selected to perform the compute request experiencing a failure before the compute request has been performed, the compute request is preferably transferred (e.g., failover) to another one of the data storage drives in the RAID array. For instance, a drive identified as having a next greatest number of the strip hash values already therein may serve as a "backup drive" and used to complete the compute request. Any data missing from the backup drive may be transferred from the failed drive in some approaches, while in other approaches the missing data may be retrieved from their source drive(s).

It follows that approaches herein include RAID arrays that are able to, in response to receiving a compute request from a host, identify which member drive(s) are storing the referenced hashes. The RAID array can then select a drive to perform the compute request based on drive matching stored hash count, drive compute capability, drive status (e.g., health), utilization, etc. Moreover, the array can identify any referenced hashes the selected drive is missing and read these hashes from other drives that contain them, before writing these hashes into spare regions of the selected drive. The array is able to request that the selected drive perform the compute request on a provided hash sequence, e.g., which represents the host data the compute request is made on. The drive can create a snapshot of the compute data based on the hash sequence, and perform the compute request on this snapshot. Furthermore, in response to the drive completing the compute request, it can discard the snapshot and return the compute outcome to the array, which in turn can provide the output to the host. Finally, the array can unmap any spare regions utilized for the request on the selected drive, e.g., as described herein.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:
1. A method comprising:
  in response to receiving a compute request that corresponds to drive strips in a RAID array, determining strip hash values that correspond to the respective drive strips;
  identifying drives in the RAID array that include one or more of the strip hash values;
  selecting one of the identified drives to conduct the compute request;
  identifying one or more of the strip hash values that are not included in the selected drive;
  causing strip data associated with the identified strip hash values not in the selected drive to be read from other ones of the identified drives;
  causing the strip data associated with the identified strip hash values read from the other ones of the identified drives to be written into spare storage space of the selected drive; and
  causing the selected drive to perform the compute request on the strip data associated with the strip hash values therein.

2. The method of claim 1, wherein the selected drive performs the compute request on the strip data associated with the strip hash values by:
creating a snapshot of the drive strips based on the strip hash values;
performing the compute request on the snapshot; and
in response to the compute request being completed:
discarding the snapshot, and
returning an outcome of the completed compute request.

3. The method of claim 2, further comprising:
in response to the snapshot being created, causing data modifications to resume in the RAID array.

4. The method of claim 2, further comprising:
in response to receiving the outcome of the completed compute request, causing the spare storage space of the selected drive to be unmapped therefrom.

5. The method of claim 1, wherein the determining the strip hash values that correspond to the respective drive strips includes:
causing geometry lookups to be performed for the respective drive strips;
causing the identified drives that include one or more of the drive strips to be queried for their respective internal hash values; and
using the internal hash values to build a compute request hash list.

6. The method of claim 1, wherein the identified drive selected to conduct the compute request has a greatest number of the strip hash values already therein.

7. The method of claim 1, further comprising:
in response to the selected drive experiencing a failure before the compute request has been performed, causing the compute request to be transferred to another one of the identified drives to conduct the compute request.

8. The method of claim 1, wherein the drives in the RAID array include solid state drives (SSDs).

9. The method of claim 8, wherein the RAID array is RAID 0 type, RAID 1 type, RAID 2 type, RAID 3 type, RAID 4 type, RAID 5 type, or RAID 6 type.

10. A computer program product, comprising:
one or more computer-readable storage media; and
program instructions stored on the one or more storage media to perform operations comprising:
in response to receiving a compute request that corresponds to drive strips in a RAID array, determining strip hash values that correspond to the respective drive strips;
identifying drives in the RAID array that include one or more of the strip hash values;
selecting one of the identified drives to conduct the compute request;
identifying one or more of the strip hash values that are not included in the selected drive;
causing strip data associated with the identified strip hash values not in the selected drive to be read from other ones of the identified drives;
causing the strip data associated with the identified strip hash values read from the other ones of the identified drives to be written into spare storage space of the selected drive; and
causing the selected drive to perform the compute request on the strip data associated with the strip hash values therein.

11. The computer program product of claim 10, wherein the selected drive performs the compute request on the strip data associated with the strip hash values by:
creating a snapshot of the drive strips based on the strip hash values;
performing the compute request on the snapshot; and
in response to the compute request being completed:
discarding the snapshot, and
returning an outcome of the completed compute request.

12. The computer program product of claim 11, wherein the operations further comprise:
in response to the snapshot being created, causing data modifications to resume in the RAID array.

13. The computer program product of claim 11, wherein the operations further comprise:
in response to receiving the outcome of the completed compute request, causing the spare storage space of the selected drive to be unmapped therefrom.

14. The computer program product of claim 10, wherein the determining the strip hash values that correspond to the respective drive strips includes:
causing geometry lookups to be performed for the respective drive strips;
causing the identified drives that include one or more of the drive strips to be queried for their respective internal hash values; and
using the internal hash values to build a compute request hash list.

15. The computer program product of claim 10, wherein the identified drive selected to conduct the compute request has a combined: greatest number of the strip hash values already therein, and greatest reliability.

16. The computer program product of claim 10, wherein the operations further comprise:
in response to the selected drive experiencing a failure before the compute request has been performed, causing the compute request to be transferred to another one of the identified drives to conduct the compute request.

17. The computer program product of claim 10, wherein the drives in the RAID array include solid state drives (SSDs).

18. The computer program product of claim 17, wherein the RAID array is RAID 0 type, RAID 1 type, RAID 5 type, or RAID 6 type.

19. A computer system, comprising:
a processor set;
one or more computer-readable storage media; and
program instructions stored on the one or more storage media to cause the processor set to perform operations comprising:
in response to receiving a compute request that corresponds to drive strips in a RAID array, determining strip hash values that correspond to the respective drive strips;
identifying drives in the RAID array that include one or more of the strip hash values;
selecting one of the identified drives to conduct the compute request;
identifying one or more of the strip hash values that are not included in the selected drive;
causing strip data associated with the identified strip hash values not in the selected drive to be read from other ones of the identified drives;
causing the strip data associated with the identified strip hash values read from the other ones of the identified drives to be written into spare storage space of the selected drive; and causing the selected drive to perform the compute request on the strip data associated with the strip hash values therein.

20. The computer system of claim 19, wherein the selected drive performs the compute request on the strip data associated with the strip hash values by:
creating a snapshot of the drive strips based on the strip hash values;
performing the compute request on the snapshot; and
in response to the compute request being completed:
discarding the snapshot, and
returning an outcome of the completed compute request.

* * * * *